United States Patent
Abotabl et al.

(10) Patent No.: US 11,588,607 B2
(45) Date of Patent: Feb. 21, 2023

(54) USER EQUIPMENT-ASSISTED INFORMATION FOR FULL-DUPLEX USER EQUIPMENT

(71) Applicant: QUALCOMM Incorporated, San Diego, CA (US)

(72) Inventors: Ahmed Attia Abotabl, San Diego, CA (US); Abdelrahman Mohamed Ahmed Mohamed Ibrahim, San Diego, CA (US); Muhammad Sayed Khairy Abdelghaffar, San Jose, CA (US); Huilin Xu, San Diego, CA (US); Krishna Kiran Mukkavilli, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 23 days.

(21) Appl. No.: 17/204,682

(22) Filed: Mar. 17, 2021

(65) Prior Publication Data

US 2022/0303105 A1 Sep. 22, 2022

(51) Int. Cl.
*H04W 52/36* (2009.01)
*H04W 72/14* (2009.01)
*H04W 76/27* (2018.01)
*H04L 5/14* (2006.01)
*H04L 27/26* (2006.01)

(52) U.S. Cl.
CPC ........ *H04L 5/1461* (2013.01); *H04L 27/2607* (2013.01); *H04W 52/36* (2013.01); *H04W 72/14* (2013.01); *H04W 76/27* (2018.02)

(58) Field of Classification Search
CPC ...... H04W 52/36; H04W 72/14; H04W 76/27
USPC .......................................................... 370/329
See application file for complete search history.

(56) References Cited

U.S. PATENT DOCUMENTS

2015/0349933 A1* 12/2015 Davydov .............. H04L 5/0073
                                                                375/298
2016/0330011 A1* 11/2016 Lee ......................... H04L 5/006

FOREIGN PATENT DOCUMENTS

| WO | WO-2015084350 A1 * | 6/2015 | ............... H04B 7/04 |
| WO | WO-2017045176 A1 * | 3/2017 | ............... H04L 1/16 |
| WO | WO-2019142512 A1 * | 7/2019 | ............. H04B 17/24 |

* cited by examiner

*Primary Examiner* — Intekhaab A Siddiquee
(74) *Attorney, Agent, or Firm* — Procopio, Cory, Hargreaves & Savitch LLP

(57) ABSTRACT

The apparatus, in some aspects may be a UE configured to communicate, in a FD mode, with at least one base station. The UE may further be configured to determine, when communicating with the at least one base station in the FD mode, FD UE assistance information including one or more FD UE assistance parameters. The UE may also be configured to transmit, to the at least one base station, an indication of the determined FD UE assistance information including the one or more FD UE assistance parameters. In some aspects, the apparatus may be a base station configured to communicate with at least one UE operating in a FD mode. The base station may further be configured to receive, from the at least one UE, an indication of FD UE assistance information including one or more FD UE assistance parameters.

30 Claims, 11 Drawing Sheets

USER EQUIPMENT-ASSISTED INFORMATION FOR FULL-DUPLEX USER EQUIPMENT

BACKGROUND

Technical Field

The present disclosure relates generally to communication systems, and more particularly, to a full-duplex (FD) capable user equipment (UE) providing FD UE assistance information to a base station.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects of wireless communication, e.g., 5G NR, a UE may communicate UE assistance information to inform the network of the UE's delay budget report including desired increment and/or decrement in the connected mode discontinuous reception (DRX) cycle length and/or overheating assistance information. For a FD-capable UE, it may be beneficial to transmit additional UE assistance information (e.g., FD UE assistance information) including information that relates to a delay budget associated with self-interference and/or FD operation in general.

In an aspect of the disclosure, a method, a computer-readable medium, and an apparatus are provided. The apparatus may be a device at a UE. The device may be a processor and/or modem at a UE or the UE itself. The UE may be configured to communicate, in a FD mode, with at least one base station. The UE may further be configured to determine, when communicating with the at least one base station in the FD mode, FD UE assistance information including one or more FD UE assistance parameters. The UE may also be configured to transmit, to the at least one base station, an indication of the determined FD UE assistance information including the one or more FD UE assistance parameters.

In some aspects, the UE is further configured to establish a radio resource control (RRC) reconfiguration procedure with the at least one base station, where the indication of the FD UE assistance information is transmitted based on the RRC reconfiguration procedure. The UE may further be configured to receive, from the at least one base station, a request for UE assistance information, where the indication of the FD UE assistance information is transmitted based on the request for UE assistance information. In some aspects, the UE may be configured to determine whether an error rate of FD communication is greater than a threshold, where the indication of the FD UE assistance information is transmitted based on the determination that the error rate of the FD communication is greater than the threshold.

In an aspect of the disclosure, a method, a computer-readable medium, and an apparatus are provided. The apparatus may be a device at a base station. The device may be a processor and/or modem at a base station or the base station itself. The base station may be configured to communicate with at least one UE operating in a FD mode. The base station may further be configured to receive, from the at least one UE, an indication of FD UE assistance information including one or more FD UE assistance parameters. In some aspects the base station may also be configured to establish an RRC reconfiguration procedure with the at least one UE, where the indication of the FD UE assistance information is received based on the RRC reconfiguration procedure. The base station may be configured to transmit, to the at least one UE, a request for UE assistance information, where the indication of the FD UE assistance information is received based on the request for UE assistance information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
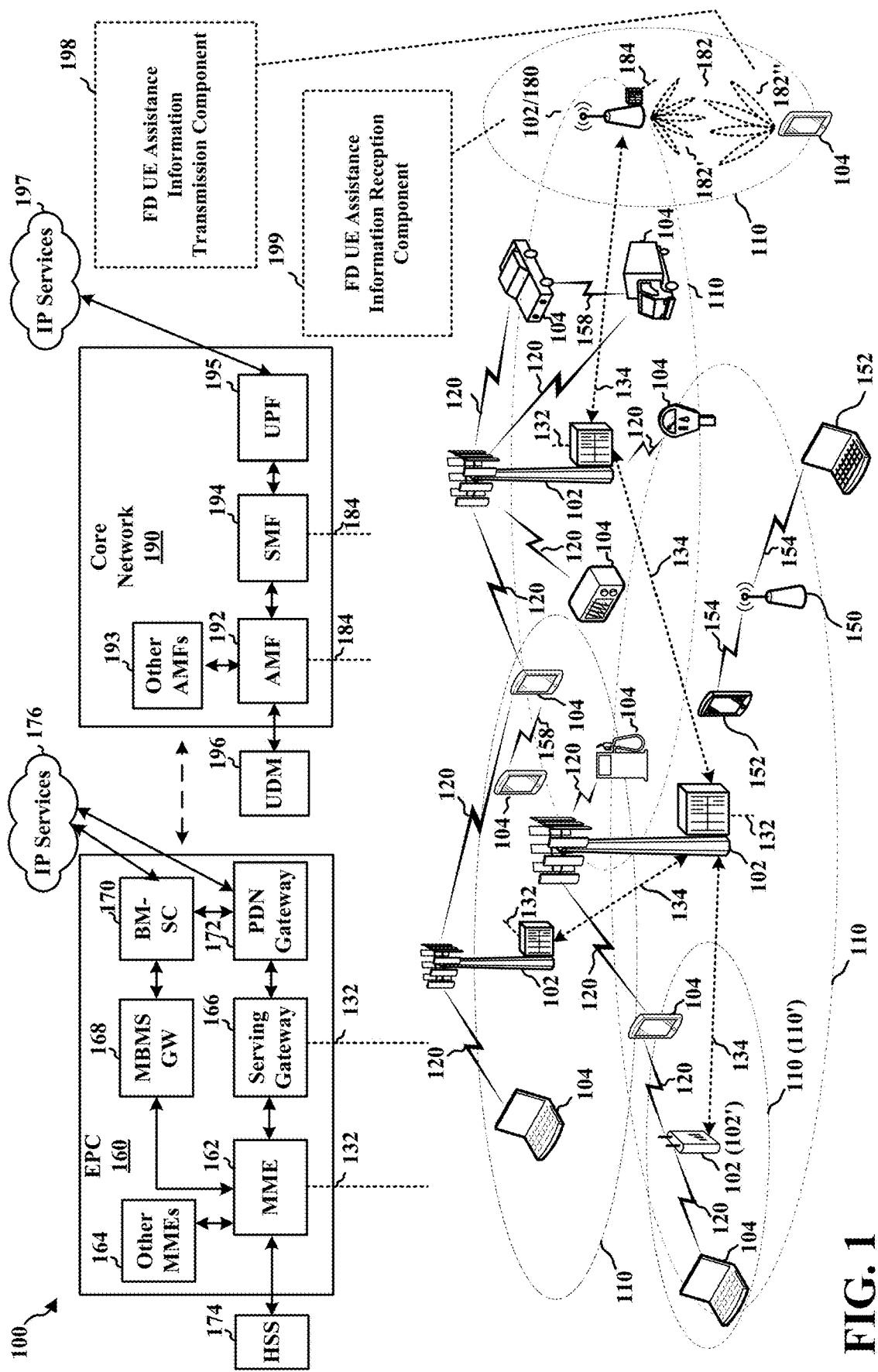
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a FD UE assistance information transmission component 198 that may be configured to communicate, in a FD mode, with at least one base station; determine, when communicating with the at least one base station in the FD mode, FD UE assistance information including one or more FD UE assistance parameters; and transmit, to the at least one base station, an indication of the determined FD UE assistance information including the one or more FD UE assistance parameters. In certain aspects, the base station 180 may include a FD UE assistance information reception component 199 that may be configured to communicate with at least one UE operating in a FD mode; and receive, from the at least one UE, an indication of FD UE assistance information including one or more FD UE assistance parameters. Although the following description may be focused on 5G NR, the concepts described herein may be applicable to other similar areas, such as LTE, LTE-A, CDMA, GSM, and other wireless technologies.

Figure 2:
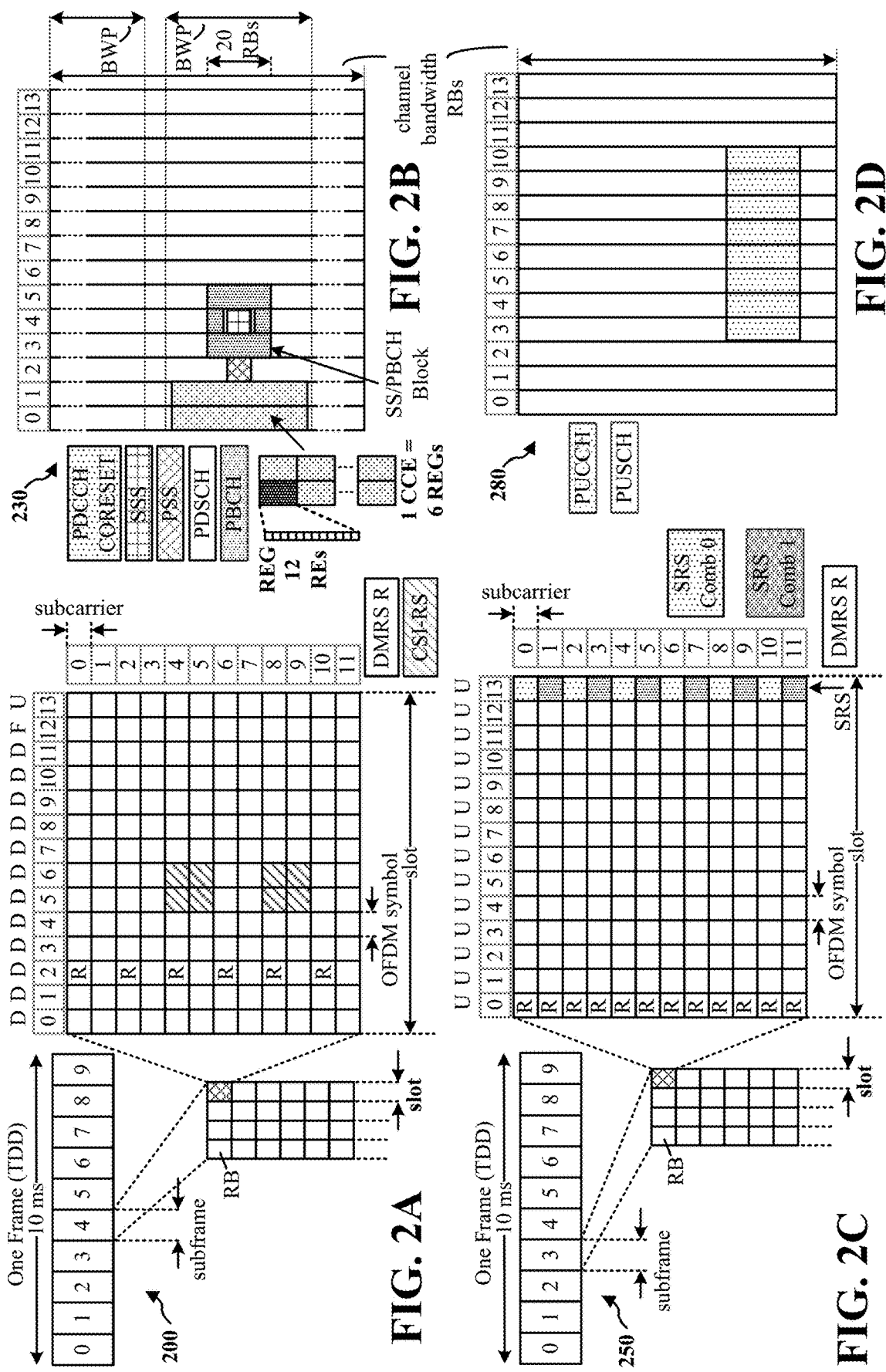
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
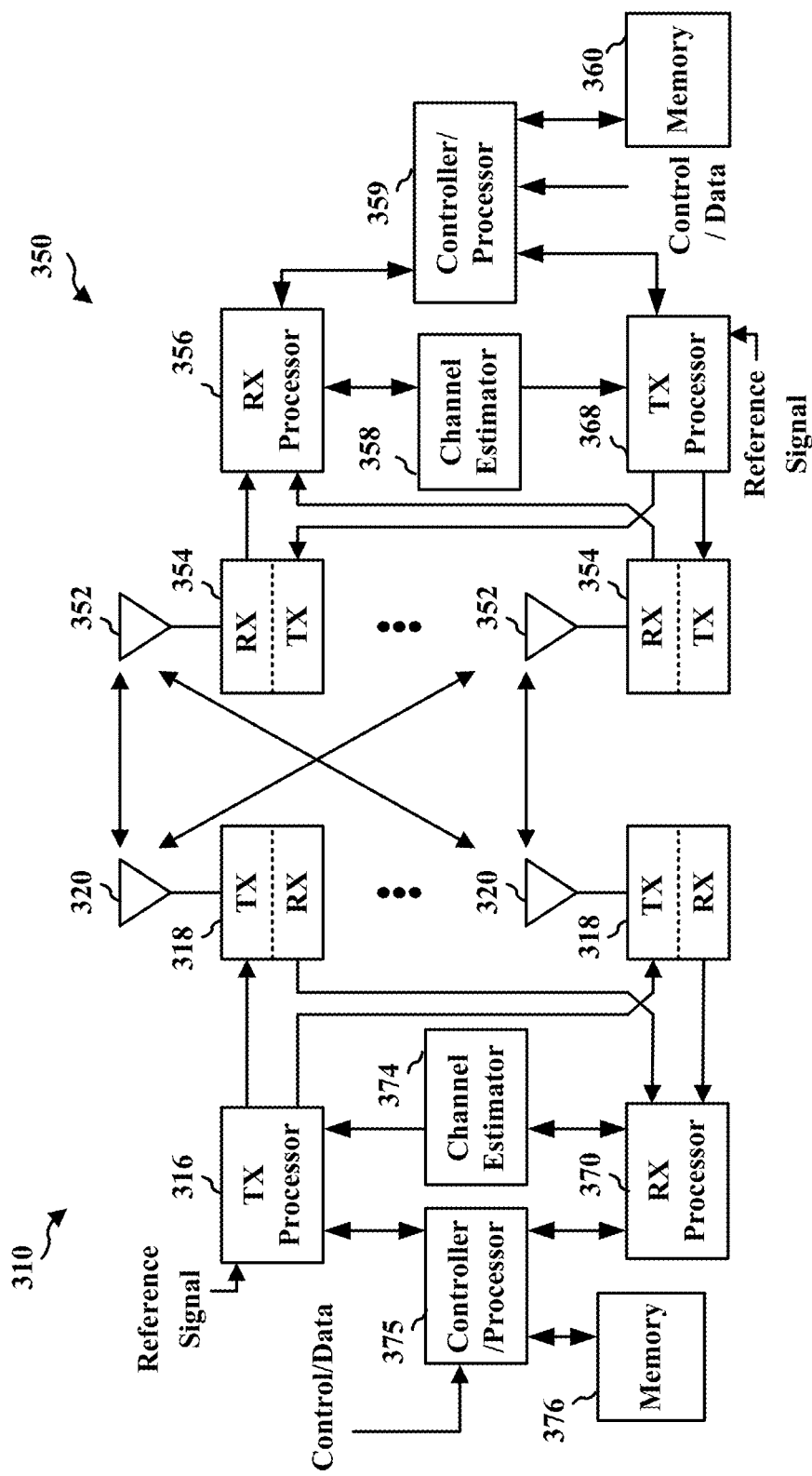
FIG. 3 is a diagram illustrating an example of a base station and UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354 TX. Each transmitter 354 TX may modulate an RF carrier with a respective spatial stream for transmission.

The UL transmission is processed at the base station 310 in a manner similar to that described in connection with the receiver function at the UE 350. Each receiver 318 RX receives a signal through its respective antenna 320. Each receiver 318 RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the FD UE assistance information transmission component 198 of FIG. 1. At least one of the TX processor 316, the RX processor 370, and the controller/processor 375 may be configured to perform aspects in connection with the FD UE assistance information reception component 199 of FIG. 1.

Figure 4:
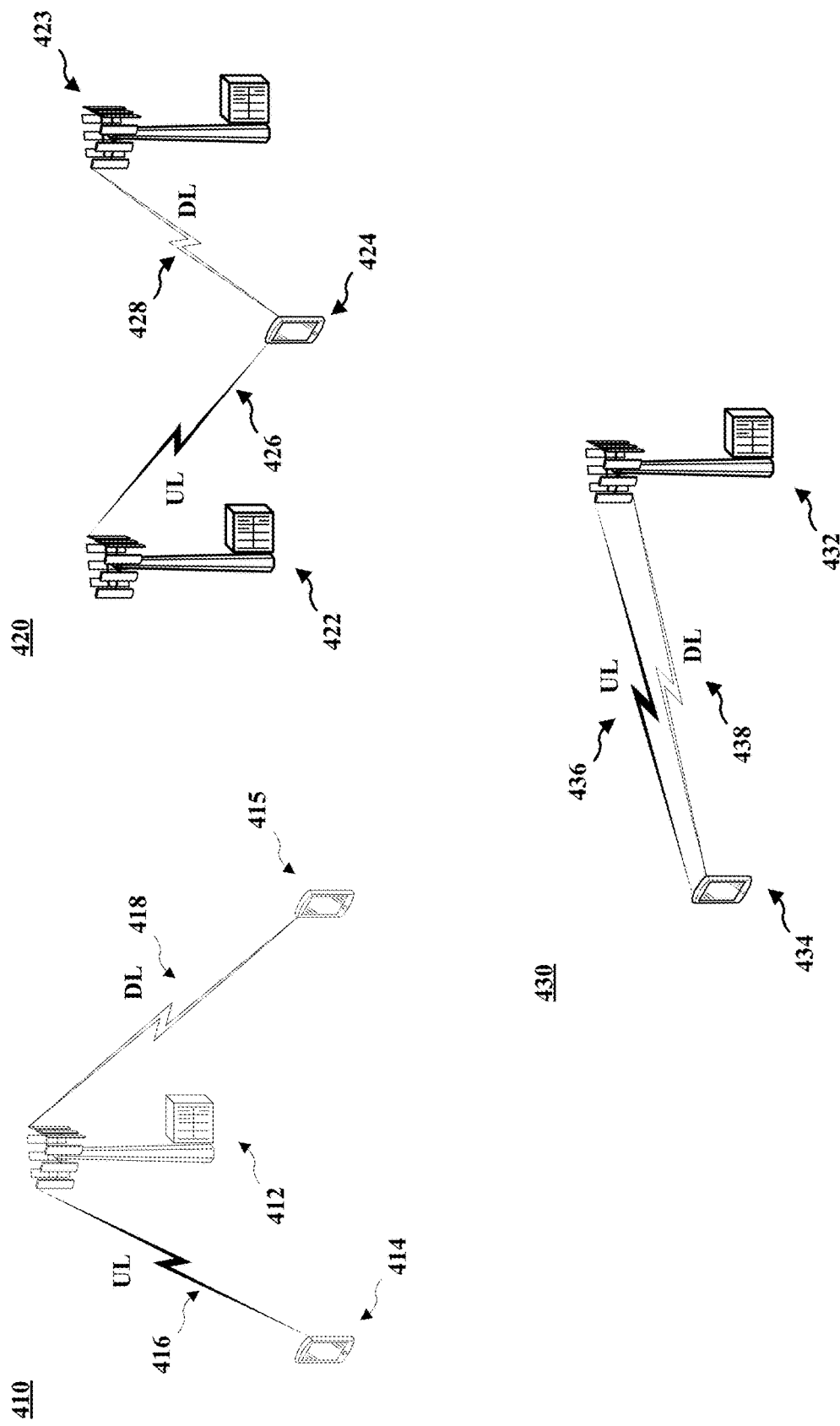
FIG. 4 includes diagrams illustrating a base station engaging in FD communication, a UE engaging in FD communication, and both a base station and a UE engaging in FD communication.

In certain aspects of wireless communication, e.g., 5G NR, one or both of a base station and a UE may engage in FD communication. FIG. 4 includes diagrams 410, 420, and 430 illustrating a base station 412 engaging in FD communication, a UE 424 engaging in FD communication, and both a base station 432 and a UE 434 engaging in FD communication. Diagram 410 illustrates a base station 412 engaging in FD communication. Specifically, the base station 412 transmits DL data 418 to a first UE 414 and receives UL data 416 from a second UE 415 at a same time. The UL data 416 received by the base station and the DL data 418 transmitted by the base station may result in self-interference at the base station (e.g., interference between the UL data transmission and the DL data transmission).

Diagram 420 illustrates a UE 424 engaging in FD communication. Specifically, the UE 424 transmits UL data 426 to a first base station 422 and receives DL data 428 from a second base station 423. The UL data 426 transmitted by the UE and the DL data 428 received by the UE may result in self-interference at the UE (e.g., interference between the UL data transmission and the DL data transmission). Diagram 430 illustrates a UE 434 and base station 432 engaging in FD communication with each other. Both the base station 432 and the UE 434 may experience self-interference between the UL data transmission 436 and the DL data transmission 438.

Figure 5:
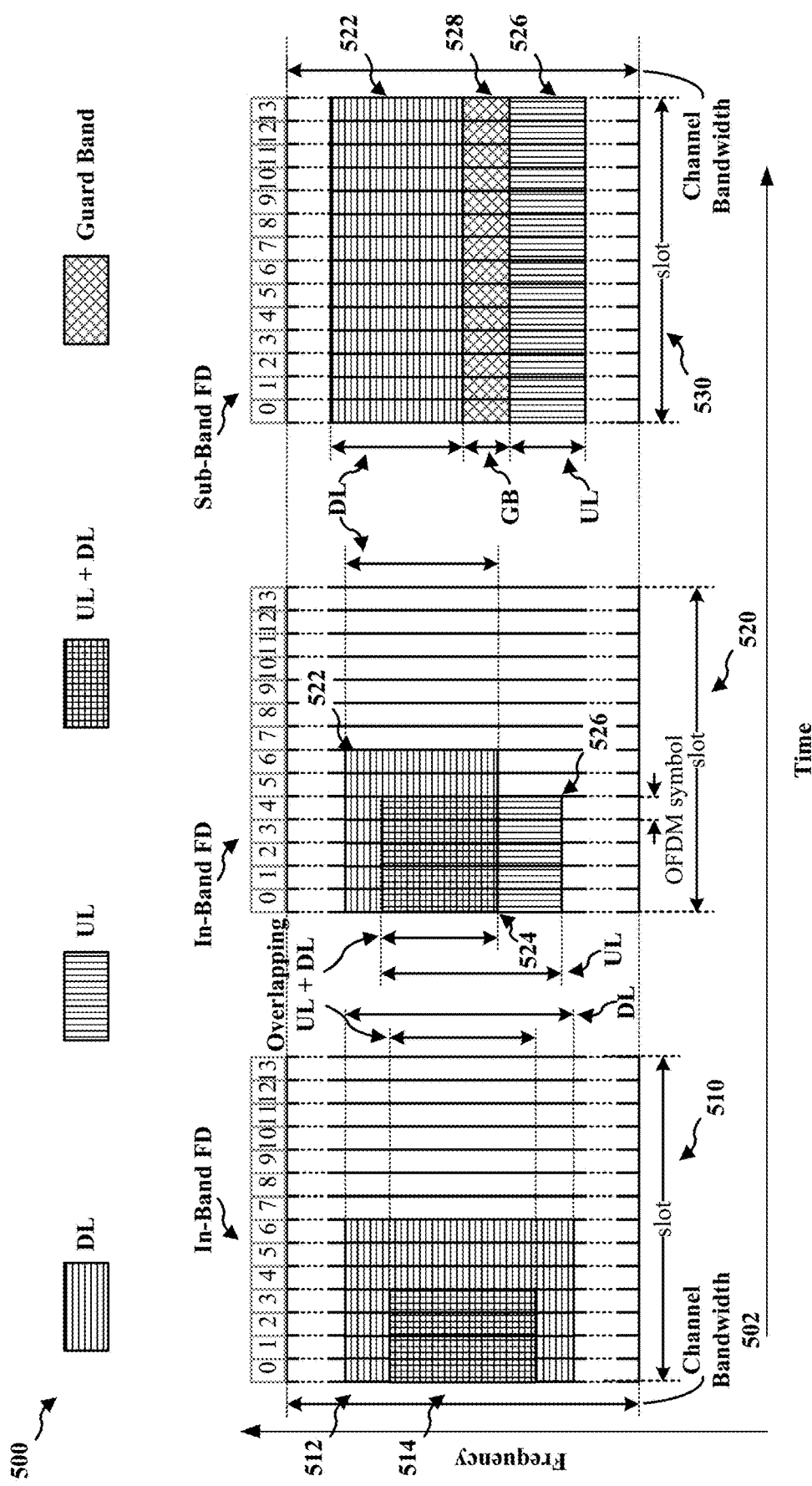
FIG. 5 is a diagram illustrating example resource allocation for in-band (IB) FD (IBFD) mode communication and sub-band (SB) FD (SBFD) mode communication.

FIG. 5 is a diagram 500 illustrating example resource allocation for IBFD mode communication and SBFD mode communication. Diagram 500 illustrates a set of slots in a particular channel having a particular channel bandwidth 502. A first example slot 510 for IBFD may include a set of DL time-and-frequency resources (e.g., resources) 512 and a set of fully-overlapping UL resources. A second example slot 520 for IBFD may include a set of DL resources 522 and a set of partially-overlapping UL resources 526 including a subset of overlapping UL resources 524. The overlapping DL and UL resources 514 and 524 indicate time-and-frequency resources that are used for both UL and DL (e.g., using different beam directionality or other self-interference cancelling or mitigating methods). In some aspects, an example slot 530 for SBFD may include non-overlapping sets of UL resources 526, DL resources 522, and guard band resources 528.

A UE may communicate UE assistance information to inform the network of the UE's delay budget report including desired increment and/or decrement in the connected mode DRX cycle length and/or overheating assistance information. For a FD-capable UE, it may be beneficial to transmit additional UE assistance information (e.g., FD UE assistance information) including information that relates to a delay budget associated with self-interference and/or FD operation in general that may be available at/to the UE (but may not be available to the base station).

Figure 6:
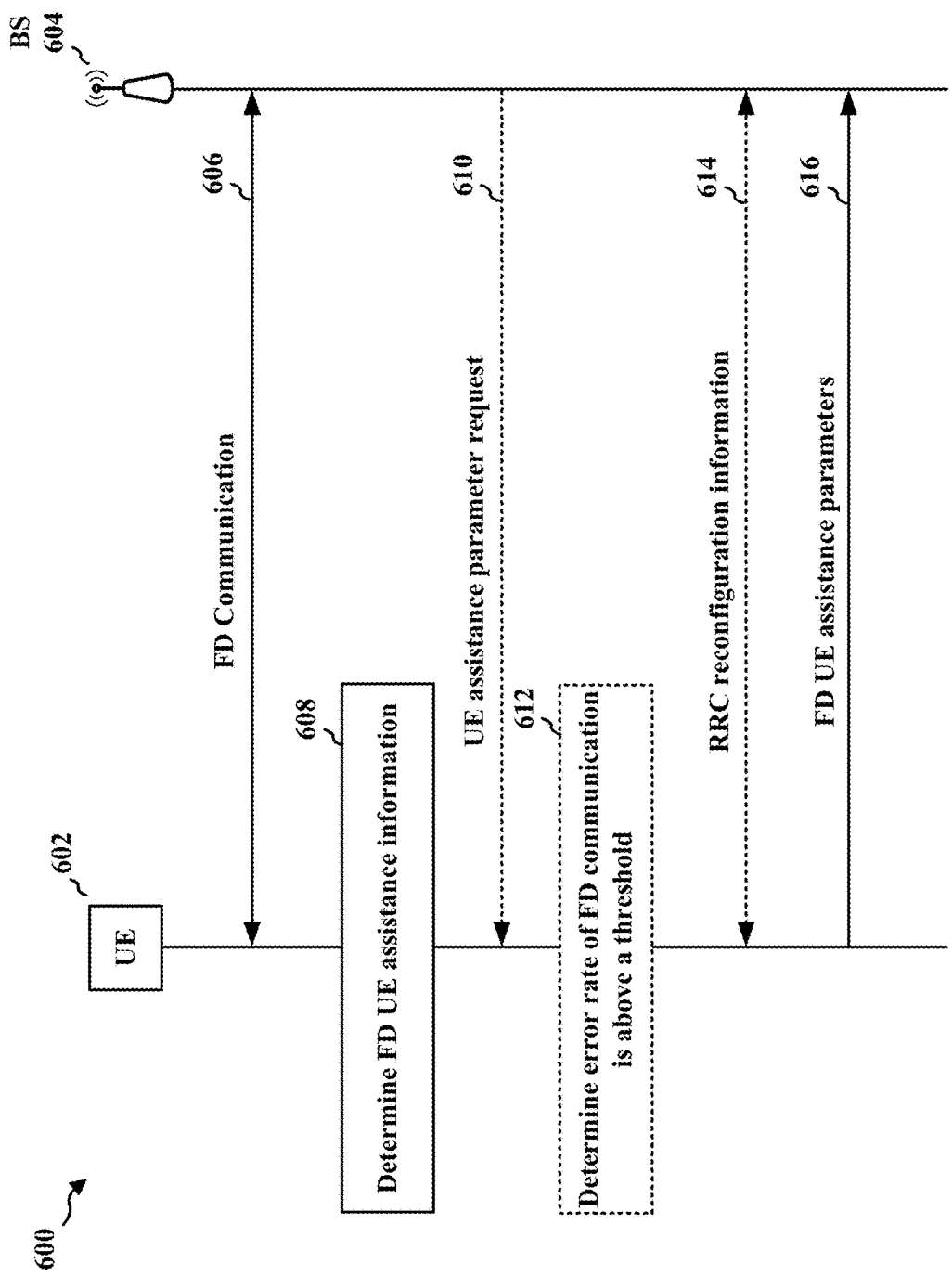
FIG. 6 is a call flow diagram illustrating a UE operating in a FD mode providing FD UE assistance information to a base station.

FIG. 6 is a call flow diagram 600 illustrating a UE 602 operating in a FD mode providing FD UE assistance information to a base station 604. Optional steps are indicated with dotted lines. Diagram 600 illustrates that UE 602 may be communicating with base station 604 via FD communication 606. The UE 602 may determine 608 FD UE assistance information. In some aspects, the base station 604 may transmit, and the UE 602 may receive, a UE assistance information request 610 (e.g., a request for an indication of a set of UE assistance parameters) to the UE 602. The UE assistance information request 610 may be a request for periodic transmission of UE assistance information transmitted by the base station 604 to the UE 602 in RRC configuration information.

In some aspects, the UE may determine 612 that an error rate of FD communication is above a threshold error rate. The UE 602 and the base station 604 may establish an RRC reconfiguration procedure and exchange RRC reconfiguration information 614. The RRC reconfiguration information 614 may include a UE assistance parameter request that may be transmitted by the base station 604, and may be received by the UE 602. Based on at least one of a UE assistance parameter request (e.g., request 610 or a request included in RRC reconfiguration information 614), a determination 612 that an error rate of the FD communication is above a threshold error rate, or upon the end of a period configured in RRC (re)configuration information, the UE 602 may transmit, and the base station 604 may receive, FD UE assistance information 616 (e.g., including FD UE assistance parameters). In some aspects, an additional FD UE assistance information determination may be performed before transmitting the FD UE assistance information 616.

The FD UE assistance information 616 may include at least one favored self-interference cancellation technique (e.g., non-linear interference cancellation (NLIC), digital pre-distortion (DPD), etc.) supported by the UE. The FD UE assistance information 616 may include a desired maximum overlap between DL and UL resources for IBFD communication. The information regarding the desired maximum overlap between DL and UL resources for IBFD communication may include information regarding a number of resources associated with the desired maximum overlap and information indicating a resource (type) associated with the number of resources, the resource (type) being one of a resource block group, a resource block, or a resource element. The information regarding the number of resources, in some aspects, indicates a negative number of resources that indicates a magnitude of a guard band in SBFD communication.

The FD UE assistance information 616 may include a desired minimum gap between DL and UL resources for SBFD communication. The information regarding the desired minimum gap between DL and UL resources for SBFD communication, in some aspects, may be provided in an information element (IE) including an identification of a guard band to use in a FD configuration. The FD UE assistance information 616 may include a recommendation for reducing a maximum UL transmit power. The FD UE assistance information 616 may include a recommendation for adjusting a timing advance (TA) parameter. The FD UE assistance information 616 may include desired DL power ramping steps for failed DL reception. The FD UE assistance information 616 may include at least one favored beam (e.g., a beam direction). The FD UE assistance information 616 may include a buffer status for an UL signal buffer and a number of UL configured grants for transmitting the information in the UL signal buffer and/or whether the UE has information to transmit in an UL configured grant. The FD UE assistance information 616 may include a recommendation about a DL transmission power to enable the UE to decode a DL transmission with UL self-interference.

Figure 7:
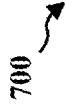
FIG. 7 is a diagram illustrating a set of IEs that may be included in FD UE assistance information to improve FD communication.

FIG. 7 is a diagram 700 illustrating a set of IEs that may be included in FD UE assistance information (e.g., including FD UE assistance parameters) to improve FD communication. Diagram 700 illustrates a MaxDLULOverlap IE 705 that may indicate a maximum overlap between DL resources and UL resources that the UE can handle (e.g., indicates a maximum amount of self-interference for an acceptable error rate of reception of DL data). The MaxDLULOverlap IE 705 may include (1) an OverlapSize field indicating a number of units of an overlap between DL and UL resources and (2) an OverlapUnit field indicating the unit (e.g., resource type) associated with the OverlapSize field. For example, the OverlapUnit field may specify one of a resource element (RE), a resource block (RB), and a physical resource block group (PRG). The maximum overlap IE may indicate a zero or negative value for an OverlapSize that indicates no overlap (e.g., for a zero value) or indicates the size of a guard band (e.g., for a negative value). Accordingly, in some aspects, the DLULGap IE 710 (discussed below) may not be transmitted and the information regarding a desired guard band may be transmitted in MaxDLULOverlap IE 705.

In some aspects, the FD UE assistance information may include a DLULGap IE 710. The DLULGap IE 710 may include (1) a GapSize field indicating a number of units of a gap between DL resources and UL resources and (2) a GapUnit field indicating the unit (e.g., resource type) associated with the GapSize field. For example, the OverlapUnit field may specify one of a RE, a RB, and a PRG. The FD UE assistance information may include an SICancellationMethod IE 715 that may indicate one or more favored self-interference cancellation methods supported by the UE. The SICancellationMethod IE 715 may include a set of fields indicating favored self-interference cancellation methods that are supported by the UE. The set of fields may include a separate field for each of multiple self-interference cancellation methods or may include a single field that may indicate one or more self-interference cancellation methods employed or favored by the UE. For example, the SICancellationMethod IE 715 may include fields for NLIC, DPD, antenna isolation, analog cancellation, etc., each of which may be associated with a different time budget and/or power consumption.

The FD UE assistance information may include a MaxULTransmissionPower IE 720 that may indicate a recommendation of a maximum UL power (e.g., "MaxULTxPower" in FIG. 7). The maximum UL power recommendation, in some aspects, may reflect a maximum UL power for which self-interference at the UE is below a threshold level. The FD UE assistance information may include a TAParameterAdjust IE 725 that may indicate a recommendation for an adjustment (e.g., a reduction) of a TA to improve self-interference cancellation (e.g., based on a correlation of the UL and DL transmissions). The FD UE assistance information may include a DLPowerRampingParameter IE 730 that may indicate a set of power ramping parameters (e.g., a set of power levels or a power level step) for increasing DL transmit power when a UE fails to receive (decode) DL data (e.g., because of self-interference). Increasing the DL transmission power, in some aspects, may mitigate or remove the effects of self-interference and allow the reception (and decoding) of DL data while transmitting UL data.

In some aspects, the FD UE assistance information may include a BeamDirection IE 735 that may indicate a favored beam direction for transmitting and/or receiving UL or DL data. The FD UE assistance information may include an ULBufferStatus IE 740 that may indicate an UL buffer status for an UL signal and a number of UL configured grants that may be used to transmit UL data/information in the UL buffer. The ULBufferStatus IE 740 may include an ULinformation field (e.g., taking a Boolean/binary value) that may indicate whether the UE has information to transmit in an UL configured grant. The ULinformation field may, in some aspects, be an independent IE and not a field in ULBufferStatus IE 740.

The UL buffer status may indicate to a base station (1) that in a first set of UL configured grants, UL data may be transmitted and (2) that in a second set of UL configured grants, UL data may not be transmitted. A base station may determine to transmit DL data with a first transmission power during the first set of UL configured grants and to transmit DL data with a second transmission power during the second set of UL configured grants. Alternatively, or additionally, a base station may schedule DL data for transmission during the second set of UL configured grants to avoid self-interference at the UE. The FD UE assistance information may include a DLTxPowerRecommendation IE 745 that may indicate a recommendation about a DL transmission power to enable a UE to decode a DL transmission with UL self-interference. The DLTxPowerRecommendation IE 745 may include a DLTxPower that may indicate a DL transmission power via an absolute value or an offset value from a reference value.

Figure 8:
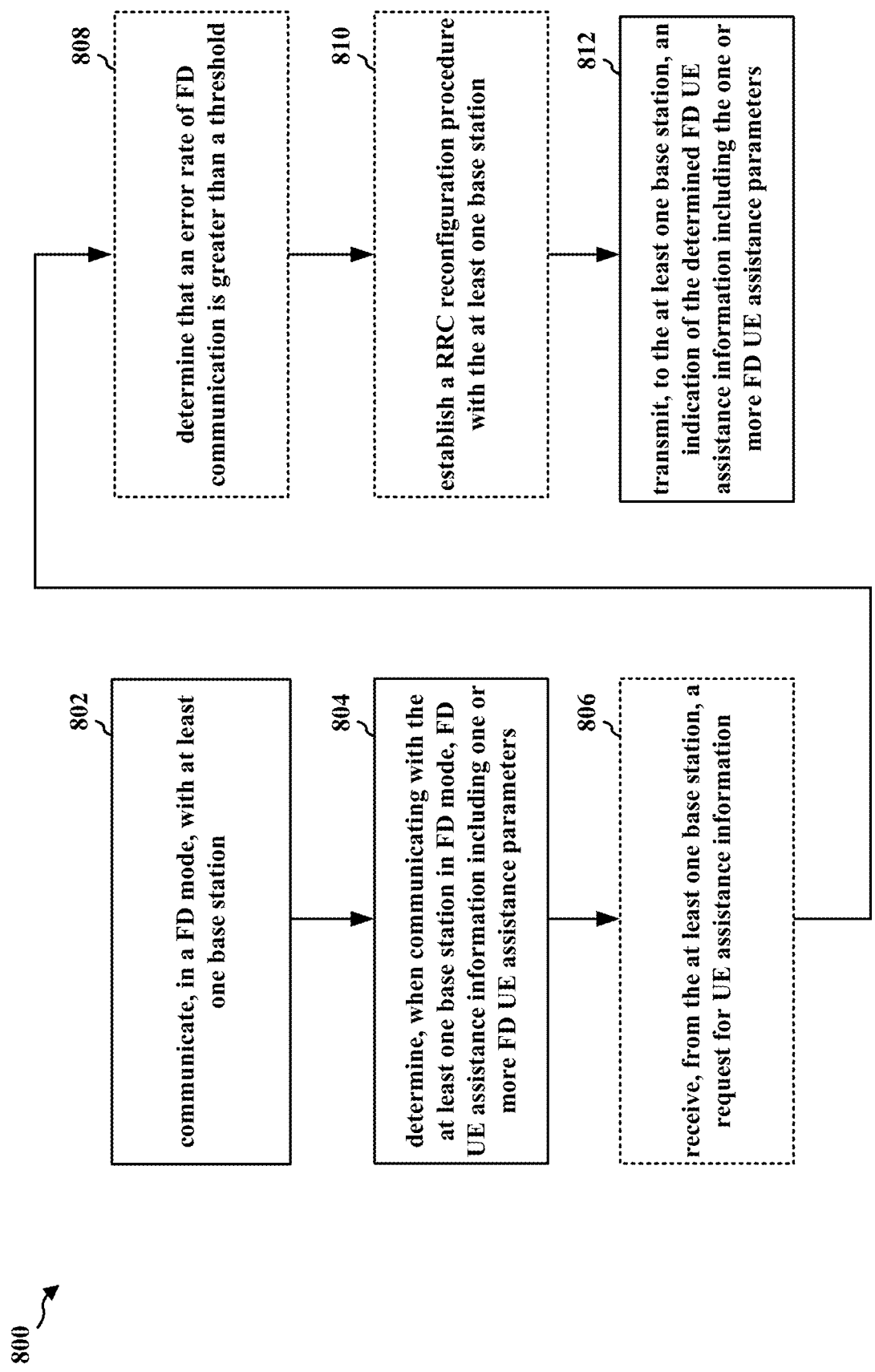
FIG. 8 is a flowchart of a method of wireless communication.

FIG. 8 is a flow diagram 800 of a method of wireless communication. The method may be performed by a (FD-capable) UE (e.g., the UE 104; the UE 602; the apparatus 1002). Optional steps are indicated with dotted lines. The UE, at 802, may communicate, in a FD mode, with at least one base station (e.g., the base station 102; the base station 604; the apparatus 1102). The FD communication may occur through multiple antennas (e.g., one antenna for each of DL transmission and UL transmission at any given time) at each of the base station and the UE. For example, referring to FIG. 6, a UE 602 may engage in FD communication 606 with a base station 604. For example, 802 may be performed by a FD communication component 1040.

At 804, the UE may determine, when communicating with the at least one base station in FD mode, FD UE assistance information including one or more FD UE assistance parameters. For example, 804 may be performed by a FD UE assistance information determination component 1042. The FD UE assistance information may include information for improving FD communication.

For example, referring to FIGS. 6 and 7, the FD UE assistance information 616 may include the SICancellationMethod IE 715 that may indicate one or more favored self-interference cancellation methods (e.g., NLIC, DPD, etc.) that are supported by the UE. The FD UE assistance information 616 may include a desired maximum overlap between DL and UL resources for IBFD communication (e.g., MaxDLULOverlap IE 705 of FIG. 7). The information regarding the desired maximum overlap between DL and UL resources for IBFD communication includes information regarding a number of resources associated with the desired maximum overlap and information indicating a resource (type) associated with the number of resources, the resource (type) being one of a resource block group, a resource block, or a resource element. The information regarding the number of resources, in some aspects, indicates a negative number of resources that indicates a magnitude of a guard band in SBFD communication.

The FD UE assistance information 616 may include a desired minimum gap between DL and UL resources for SBFD communication (e.g., the DLULGap IE 710 of FIG. 7). The information regarding the desired minimum gap between DL and UL resources for SBFD communication, in some aspects, may be provided in an IE including an identification of a guard band to use in a FD configuration. The FD UE assistance information 616 may include a recommendation for reducing a maximum UL transmit power (e.g., the MaxULTransmissionPower IE 720 of FIG. 7). The FD UE assistance information 616 may include a recommendation for adjusting a TA parameter (e.g., TAParameterAdjust IE 725 of FIG. 7). The FD UE assistance information 616 may include desired DL power ramping steps for failed DL reception (e.g., DLPowerRampingParameter IE 730 of FIG. 7). The FD UE assistance information 616 may include at least one favored beam for one of UL and DL transmissions (e.g., the BeamDirection IE 735 of FIG. 7). The FD UE assistance information 616 may include a buffer status for an UL signal buffer and a number of UL configured grants for transmitting the information in the UL signal buffer and/or whether the UE has information to transmit in an UL configured grant (e.g., the ULBufferStatus IE 740 of FIG. 7). The FD UE assistance information 616 may include a recommendation about a DL transmission power to enable the UE to decode a DL transmission with UL self-interference (e.g., the DLTxPowerRecommendation IE 745 of FIG. 7).

The UE, at 806, may receive, from the at least one base station, a request for UE assistance information, where an indication of the FD UE assistance information determined at 804 may be transmitted, at 812, based on the request for UE assistance information. For example, 806 may be performed by a FD UE assistance information transmission triggering component 1044. The request for UE assistance information may be implicit in an RRC configuration and may include a request for periodic transmission of UE assistance information or a request for a transmission of current UE assistance information and additional transmissions of UE assistance information upon changes to the UE assistance information (e.g., a change in a delay budget). For example, referring to FIG. 6, a UE 602 may receive a UE assistance information request 610 that may be transmitted by base station 604.

In some aspects, the UE, at 808, may determine that an error rate (e.g., a block error rate (BLER)) of FD communication is greater than a threshold, where the indication of the FD UE assistance information determined at 804 may be transmitted, at 812, based on the determination at 808 that the error rate of the FD communication is greater than the threshold. For example, 808 may be performed by a FD UE assistance information transmission triggering component 1044. For example, referring to FIGS. 6 and 7, a UE 602 may determine 612 that an error rate of FD communication is above a threshold error rate and may transmit FD UE assistance information 616 based on the determination 612. The FD UE assistance information based on an error rate that is detected to be above a threshold rate may include any of the IEs of FIG. 7 and specifically may include DLPowerRampingParameter IE 730 and/or DLTxPowerRecommendation IE 745.

At 810, the UE may establish an RRC reconfiguration procedure with the at least one base station, where the indication of the FD UE assistance information determined at 804 may be transmitted, at 812, based on the RRC reconfiguration procedure. For example, 810 may be performed by a FD UE assistance information transmission triggering component 1044. The RRC reconfiguration procedure may include an explicit and/or implicit request for UE assistance information. For example, the RRC reconfiguration procedure may include a request for periodic transmission of UE assistance information or a request for a transmission of current UE assistance information and additional transmissions of UE assistance information upon changes to the UE assistance information (e.g., a change in a delay budget). For example, referring to FIG. 6, a UE 602 may establish an RRC reconfiguration procedure and receive RRC reconfiguration information 614 that may be transmitted by base station 604 and may trigger a transmission of FD UE assistance information 616.

At 812, the UE may transmit, to the at least one base station, an indication of the determined FD UE assistance information including the one or more FD UE assistance parameters. For example, 812 may be performed by a FD UE assistance information transmission component 1046. For example, referring to FIGS. 6 and 7, a UE 602 may transmit FD UE assistance information 616 determined at 608 to at least one base station 604. The transmitted FD UE assistance information 616 may include any of the IEs 705-745 illustrated in FIG. 7 to improve the FD communication between the UE 602 and the base station 604.

Figure 9:
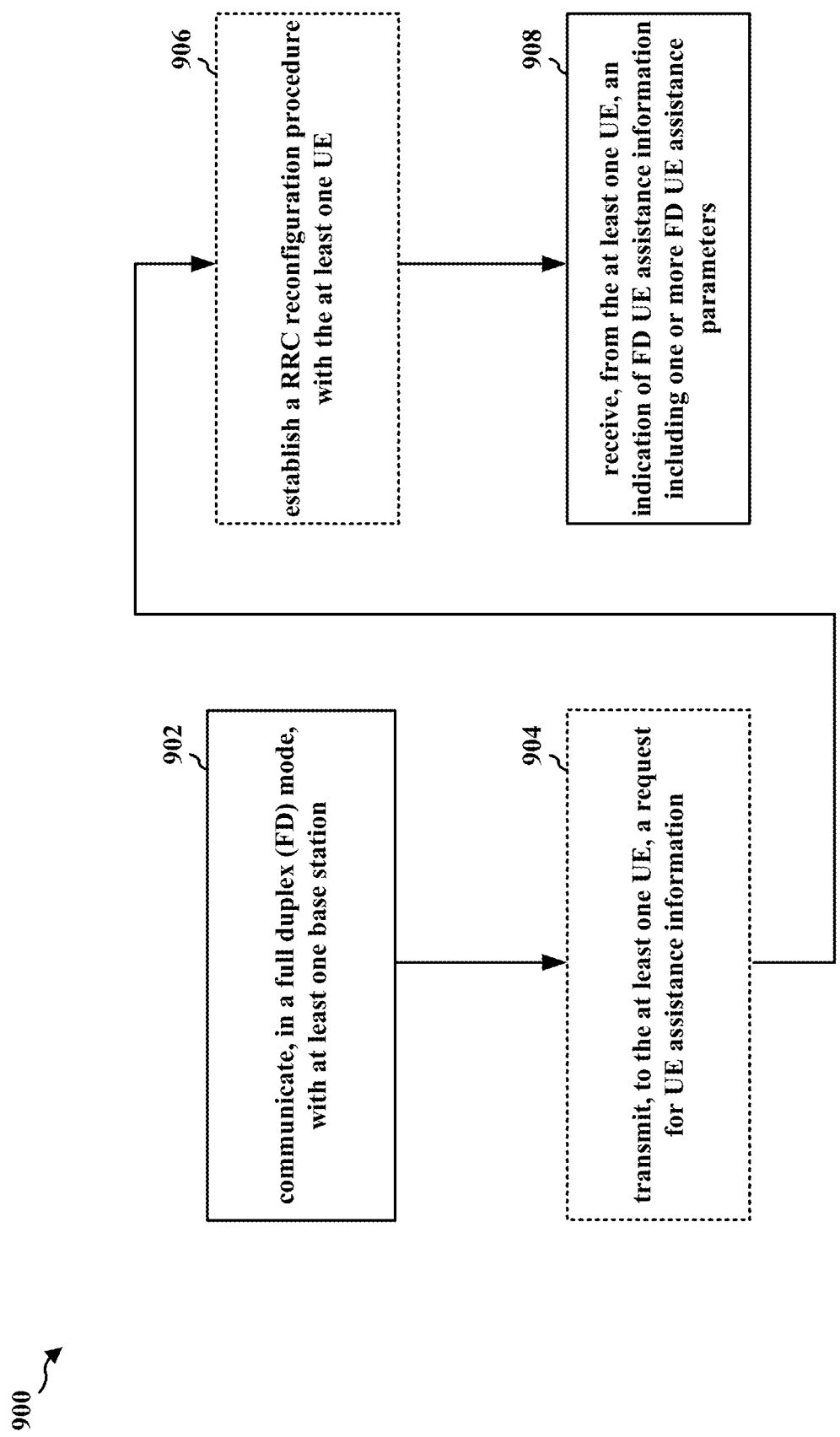
FIG. 9 is a flowchart of a method of wireless communication.

FIG. 9 is a flow diagram 900 of a method of wireless communication. The method may be performed by a (FD-capable) base station (e.g., the base station 102; the UE 604; the apparatus 1102). Optional steps are indicated with dotted lines. The base station, at 902, may communicate with at least one user equipment (UE) (e.g., the UE 104; the UE 602; the apparatus 1002) operating in a FD mode. The FD communication may occur through multiple antennas (e.g., one antenna for each of DL transmission and UL transmission at any given time) at each of the base station and the UE. For example, referring to FIG. 6, a base station 604 may engage in FD communication 606 with a UE 602. For example, 902 may be performed by a FD communication component 1140.

The base station, at 904, may transmit, to the at least one UE, a request for UE assistance information, where the indication of the FD UE assistance information may be received, at 908, based on the request for UE assistance information. For example, 904 may be performed by a FD UE assistance information request component 1142. The request for UE assistance information may be implicit in an RRC configuration and may include a request for periodic transmission of UE assistance information or a request for a transmission of current UE assistance information and additional transmissions of UE assistance information upon changes to the UE assistance information (e.g., a change in a delay budget). For example, referring to FIG. 6, a base station 604 may transmit a UE assistance information request 610 that may be received by UE 602.

At 906, the base station may establish an RRC reconfiguration procedure with the at least one UE, where the indication of the FD UE assistance information may be received, at 908, based on the RRC reconfiguration procedure. For example, 906 may be performed by a FD UE assistance information request component 1142. The RRC reconfiguration procedure may include an explicit and/or implicit request for UE assistance information. For example, the RRC reconfiguration procedure may include a request for periodic transmission of UE assistance information or a request for a transmission of current UE assistance information and additional transmissions of UE assistance information upon changes to the UE assistance information (e.g., a change in a delay budget). For example, referring to FIG. 6, a base station 604 may establish an RRC reconfiguration procedure and transmit RRC reconfiguration information 614 that may be received by UE 602 and may trigger a transmission of FD UE assistance information 616.

At 908, the base station may receive, from the at least one UE, an indication of FD UE assistance information including one or more FD UE assistance parameters. For example, 908 may be performed by a FD UE assistance information reception component 1144. The FD UE assistance information received by the base station may include information for improving FD communication.

For example, referring to FIGS. 6 and 7, the FD UE assistance information 616 that may be received by the base station 604 may include the SICancellationMethod IE 715 that may indicate one or more favored self-interference cancellation methods (e.g., NLIC, DPD, etc.) that are supported by the UE. The FD UE assistance information 616 may include a desired maximum overlap between DL and UL resources for IBFD communication (e.g., MaxDLULOverlap IE 705 of FIG. 7). The information regarding the desired maximum overlap between DL and UL resources for IBFD communication includes information regarding a number of resources associated with the desired maximum overlap and information indicating a resource (type) associated with the number of resources, the resource (type) being one of a resource block group, a resource block, or a resource element. The information regarding the number of resources, in some aspects, indicates a negative number of resources that indicates a magnitude of a guard band in SBFD communication.

The FD UE assistance information 616 may include a desired minimum gap between DL and UL resources for SBFD communication (e.g., the DLULGap IE 710 of FIG. 7). The information regarding the desired minimum gap between DL and UL resources for SBFD communication, in some aspects, may be provided in an IE including an identification of a guard band to use in a FD configuration. The FD UE assistance information 616 may include a recommendation for reducing a maximum UL transmit power (e.g., the MaxULTransmissionPower IE 720 of FIG. 7). The FD UE assistance information 616 may include a recommendation for adjusting a TA parameter (e.g., TAParameterAdjust IE 725 of FIG. 7). The FD UE assistance information 616 may include desired DL power ramping steps for failed DL reception (e.g., DLPowerRampingParameter IE 730 of FIG. 7). The FD UE assistance information 616 may include at least one favored beam for one of UL and DL transmissions (e.g., the BeamDirection IE 735 of FIG. 7). The FD UE assistance information 616 may include a buffer status for an UL signal buffer and a number of UL configured grants for transmitting the information in the UL signal buffer and/or whether the UE has information to transmit in an UL configured grant (e.g., the ULBufferStatus IE 740 of FIG. 7). The FD UE assistance information 616 may include a recommendation about a DL transmission power to enable the UE to decode a DL transmission with UL self-interference (e.g., the DLTxPowerRecommendation IE 745 of FIG. 7).

Figure 10:
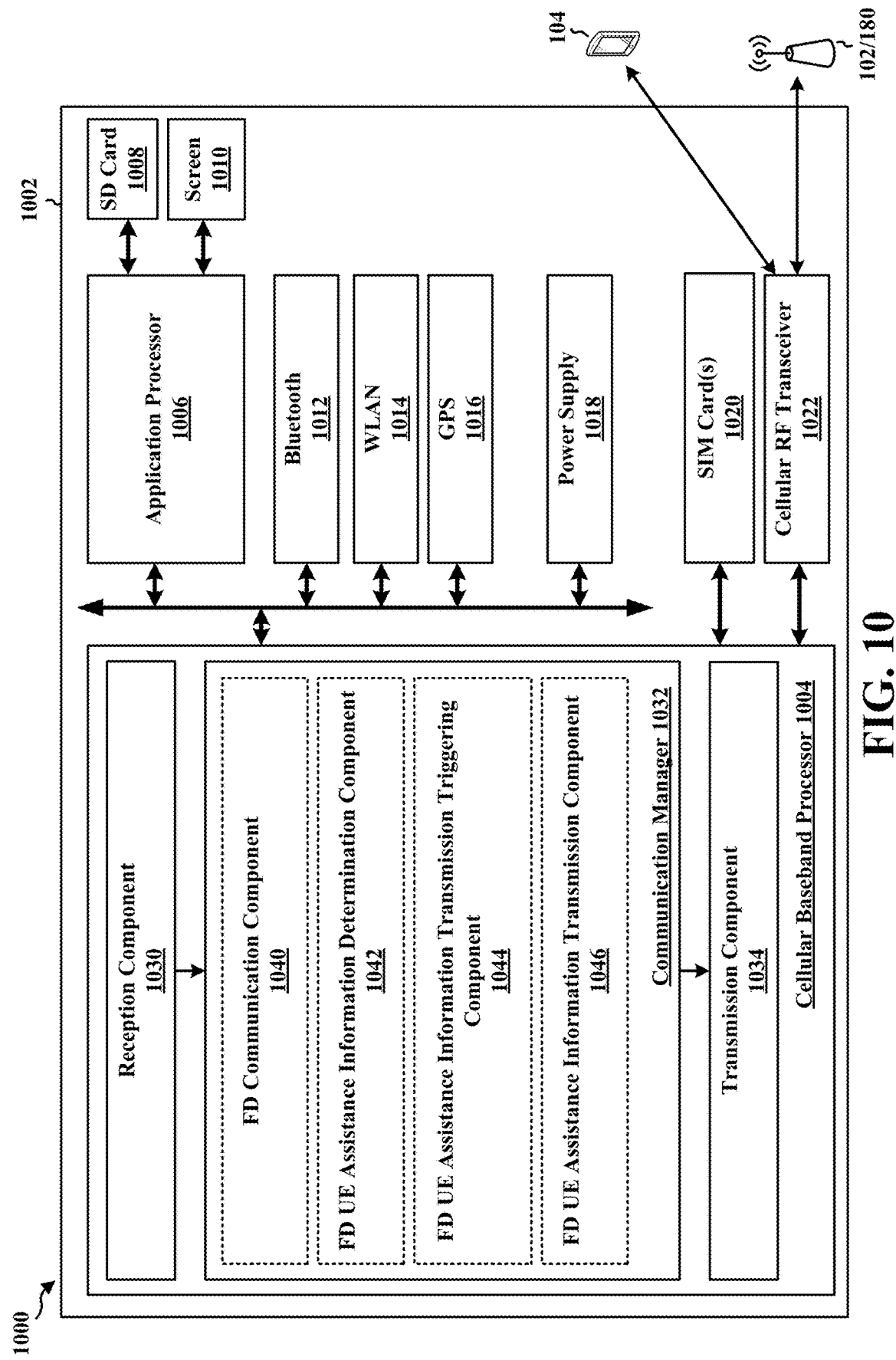
FIG. 10 is a diagram illustrating an example of a hardware implementation for an example apparatus.

FIG. 10 is a diagram 1000 illustrating an example of a hardware implementation for an apparatus 1002. The apparatus 1002 is a UE and includes a cellular baseband processor 1004 (also referred to as a modem) coupled to a cellular RF transceiver 1022 and one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, and a power supply 1018. The cellular baseband processor 1004 communicates through the cellular RF transceiver 1022 with the UE 104 and/or BS 102/180. The cellular baseband processor 1004 may include a computer-readable medium/memory. The computer-readable medium/memory may be non-transitory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 350 and may include the memory 360 and/or at least one of the TX processor 368, the RX processor 356, and the controller/processor 359. In one configuration, the apparatus 1002 may be a modem chip and include just the baseband processor 1004, and in another configuration, the apparatus 1002 may be the entire UE (e.g., see 350 of FIG. 3) and include the aforediscussed additional modules of the apparatus 1002.

The communication manager 1032 includes a FD communication component 1040 that may be configured to communicate, in a FD mode, with a base station, e.g., as described in connection with 802 of FIG. 8. The communication manager 1032 further includes a FD UE assistance information determination component 1042 that receives input in the form of information regarding the FD communication from the FD communication component 1040 and may be configured to determine, when communicating with the at least one base station in FD mode, FD UE assistance information including one or more FD UE assistance parameters, e.g., as described in connection with 804 of FIG. 8. The communication manager 1032 further includes a FD UE assistance information transmission triggering component 1044 that receives input in the form of UE assistance information requests (e.g., in the context of RRC (re)configuration procedures) and error rates (e.g., BLER) of the FD communication from the component 1040 and may be configured to receive, from the at least one base station, a request for UE assistance information, determine that an error rate (e.g., a BLER) of FD communication is greater than a threshold, and/or establish an RRC reconfiguration procedure with the at least one base station, e.g., as described in connection with 806-810 of FIG. 8. The communication manager 1032 further includes a FD UE assistance information transmission component 1046 that receives input in the form of determined FD UE assistance information from the FD UE assistance information determination component 1042 and information regarding a FD UE transmission trigger from the FD UE assistance information transmission triggering component 1044 and may be configured to transmit, to the at least one base station, an indication of the determined FD UE assistance information including the one or more FD UE assistance parameters, e.g., as described in connection with 812 of FIG. 8.

The apparatus may include additional components that perform each of the blocks of the algorithm in the aforementioned flowcharts of FIG. 8. As such, each block in the aforementioned flowcharts of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the cellular baseband processor 1004, includes means for communicating, in a FD mode, with at least one base station. The apparatus 1002, and in particular the cellular baseband processor 1004, may further include means for determining, when communicating with the at least one base station in FD mode, FD UE assistance information including one or more FD UE assistance parameters. The apparatus 1002, and in particular the cellular baseband processor 1004, may further include means for establishing an RRC reconfiguration procedure with the at least one base station. The apparatus 1002, and in particular the cellular baseband processor 1004, may further include means for receiving, from the at least one base station, a request for UE assistance information. The apparatus 1002, and in particular the cellular baseband processor 1004, may further include means for determining whether an error rate of FD communication is greater than a threshold. The apparatus 1002, and in particular the cellular baseband processor 1004, may further include means for transmitting, to the at least one base station, an indication of the determined FD UE assistance information including the one or more FD UE assistance parameters, where the indication of the FD UE assistance information may be transmitted based on one of the RRC reconfiguration procedure, the request for UE assistance information, or the determination that the error rate of the FD communication is greater than the threshold. The aforementioned means may be one or more of the aforementioned components of the apparatus 1002 configured to perform the functions recited by the aforementioned means. As described supra, the apparatus 1002 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 11:
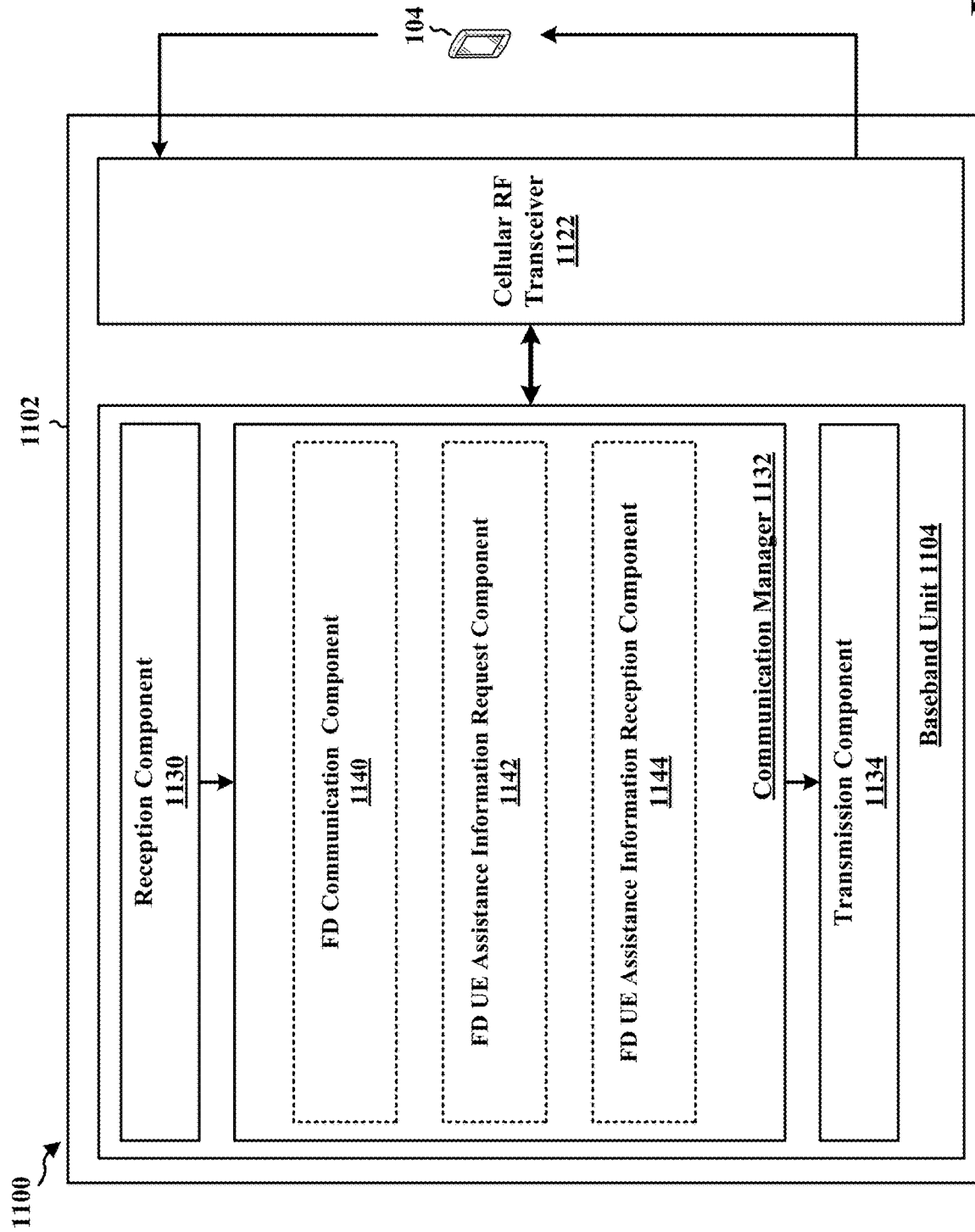
FIG. 11 is a diagram illustrating an example of a hardware implementation for an example apparatus.

FIG. 11 is a diagram 1100 illustrating an example of a hardware implementation for an apparatus 1102. The apparatus 1102 is a BS and includes a baseband unit 1104. The baseband unit 1104 may communicate through a cellular RF transceiver 1122 with the UE 104. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the BS 310 and may include the memory 376 and/or at least one of the TX processor 316, the RX processor 370, and the controller/processor 375.

The communication manager 1132 includes a FD communication component 1140 that may be configured to communicate with at least one UE operating in a FD mode, e.g., as described in connection with 902 of FIG. 9. The communication manager 1132 further includes a FD UE assistance information request component 1142 that may be configured to establish an RRC reconfiguration procedure with the at least one UE, transmitting, to the at least one UE, a request for UE assistance information, e.g., as described in connection with 904 and 906 of FIG. 9. The communication manager 1132 further includes a FD UE assistance information reception component 1144 that may be configured to receive, from the at least one UE, an indication of FD UE assistance information including one or more FD UE assistance parameters, e.g., as described in connection with 908 of FIG. 9.

The apparatus may include additional components that perform each of the blocks of the algorithm in the aforementioned flowcharts of FIG. 9. As such, each block in the aforementioned flowcharts of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the baseband unit 1104, includes means for communicating with at least one UE operating in a FD mode. In one configuration, the apparatus 1102, and in particular the baseband unit 1104, may also include means for establishing an RRC reconfiguration procedure with the at least one UE. In one configuration, the apparatus 1102, and in particular the baseband unit 1104, may also include means for transmitting, to the at least one UE, a request for UE assistance information. In one configuration, the apparatus 1102, and in particular the baseband unit 1104, may also include means for receiving, from the at least one UE, an indication of FD UE assistance information including one or more FD UE assistance parameters. The aforementioned means may be one or more of the aforementioned components of the apparatus 1102 configured to perform the functions recited by the aforementioned means. As described supra, the apparatus 1102 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

In some aspects of wireless communication, e.g., 5G NR, a UE may communicate UE assistance information to inform the network of the UE's delay budget report including desired increment and/or decrement in the connected mode DRX cycle length and/or overheating assistance information. For a FD-capable UE, it may be beneficial to transmit additional UE assistance information (e.g., FD UE assistance information) including information that relates to a delay budget associated with self-interference and/or FD operation in general that may be available at/to the UE (but may not be available to the base station).

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a UE, including communicating, in a FD mode, with at least one base station; determining, when communicating with the at least one base station in FD mode, FD UE assistance information including one or more FD UE assistance parameters; and transmitting, to the at least one base station, an indication of the determined FD UE assistance information including the one or more FD UE assistance parameters.

Aspect 2 is the method of aspect 1, where the FD UE assistance information includes information regarding at least one of (1) at least one favored self-interference cancellation technique employed supported by the UE, (2) a desired maximum overlap between DL and UL resources for IBFD communication, (3) a desired minimum gap between DL and UL resources for SBFD communication, (4) a recommendation for reducing a maximum UL transmit power, (5) a recommendation for adjusting a TA parameter, (6) desired DL power ramping steps for failed DL reception, (7) at least one favored beam, (8) a buffer status for an UL signal buffer and a number of UL configured grants for transmitting the information in the UL signal buffer, (9) whether the UE has information to transmit in an UL configured grant, or (10) a recommendation about a DL transmission power to enable the UE to decode a DL transmission with UL self-interference.

Aspect 3 is the method of aspect 2, where the information regarding the desired maximum overlap between DL and UL resources for IBFD communication includes information regarding a number of resources associated with the desired maximum overlap and information indicating a resource associated with the number of resources, the resource being one of a resource block group, a resource block, or a resource element.

Aspect 4 is the method of aspect 3, where the information regarding the number of resources indicates a negative number of resources that indicates a magnitude of a guard band in SBFD communication.

Aspect 5 is the method of aspect 2, where the information regarding the desired minimum gap between DL and UL resources for SBFD communication is provided in an information element comprising an identification of a guard band to use in a FD configuration.

Aspect 6 is the method of any of aspects 1 to 5, further including establishing an RRC reconfiguration procedure with the at least one base station, where the indication of the FD UE assistance information is transmitted based on the RRC reconfiguration procedure.

Aspect 7 is the method of any of aspects 1 to 5, further including receiving, from the at least one base station, a request for UE assistance information, where the indication of the FD UE assistance information is transmitted based on the request for UE assistance information.

Aspect 8 is the method of any of aspects 1 to 5, further comprising determining whether an error rate of FD communication is greater than a threshold, where the indication of the FD UE assistance information is transmitted based on the determination that the error rate of the FD communication is greater than the threshold.

Aspect 9 is a method of wireless communication at a base station, including communicating with at least one UE operating in a FD mode; and receiving, from the at least one UE, an indication of FD UE assistance information including one or more FD UE assistance parameters.

Aspect 10 is the method of aspect 9, where the FD UE assistance information includes information regarding at least one of (1) at least one favored self-interference cancellation technique supported by the UE, (2) a desired maximum overlap between DL and UL resources for IBFD communication, (3) a desired minimum gap between DL and UL resources for SBFD communication, (4) a recommendation for reducing a maximum UL transmit power, (5) a recommendation for adjusting a TA parameter, (6) desired DL power ramping steps for failed DL reception, (7) at least one favored beam, (8) a buffer status for an UL signal buffer and a number of UL configured grants for transmitting the information in the UL signal buffer, (9) whether the UE has information to transmit in an UL configured grant, or (10) a recommendation about a DL transmission power to enable the UE to decode a DL transmission with UL self-interference.

Aspect 11 is the method of aspect 10, where the information regarding the desired maximum overlap between DL and UL resources for IBFD communication includes information regarding a number of resources associated with the desired maximum overlap and information indicating a resource associated with the number of resources, the resource being one of a resource block group, a resource block, or a resource element.

Aspect 12 is the method of aspects 11, where the information regarding the number of resources indicates a negative number of resources that indicates a magnitude of a guard band in SBFD communication.

Aspect 13 is the method of aspect 10, where the information regarding the desired minimum gap between DL and UL resources for SBFD communication is received in an information element comprising an identification of a guard band to use in a FD configuration.

Aspect 14 is the method of any of aspects 1 to 13, further including establishing an RRC reconfiguration procedure with the at least one UE, where the indication of the FD UE assistance information is received based on the RRC reconfiguration procedure.

Aspect 15 is the method of any of aspects 1 to 13, further including transmitting, to the at least one UE, a request for UE assistance information, where the indication of the FD UE assistance information is received based on the request for UE assistance information.

Aspect 16 is the method of any of aspects 1 to 13, where the indication of the FD UE assistance information is received based on an error rate of the FD communication being greater than a threshold.

Aspect 17 is an apparatus for wireless communication including at least one processor coupled to a memory and configured to implement a method as in any of aspects 1 to 16.

Aspect 18 is an apparatus for wireless communication including means for implementing a method as in any of aspects 1 to 16.

Aspect 19 is a computer-readable medium storing computer executable code, where the code when executed by a processor causes the processor to implement a method as in any of aspects 1 to 16.

What is claimed is:

1. An apparatus for wireless communication at a user equipment (UE), comprising:
a memory; and
at least one processor coupled to the memory and configured to:
communicate, in a full duplex (FD) mode, with at least one base station;
determine, when communicating with the at least one base station in FD mode, FD UE assistance information including a maximum overlap between downlink (DL) resources and uplink (UL) resources for FD communication; and
transmit, to the at least one base station, an indication of the determined FD UE assistance information including an indication of the maximum overlap between the DL and UL resources for the FD communication.

2. The apparatus of claim 1, wherein the FD UE assistance information further comprises an indication of at least one of (1) at least one favored self-interference cancellation technique supported by the UE, (2) the maximum overlap between the DL and UL resources for in-band (IB) FD (IBFD) communication, (3) a minimum gap between DL and UL resources for sub-band (SB) FD (SBFD) communication, (4) a recommendation for reducing a maximum UL transmit power, (5) a recommendation for adjusting a timing advance (TA) parameter, (6) DL power ramping steps for failed DL reception, (7) at least one favored beam, (8) a buffer status for an UL signal buffer and a number of UL configured grants for transmitting information in the UL signal buffer, (9) whether the UE has information to transmit in an UL configured grant, or (10) a recommendation about a DL transmission power to enable the UE to decode a DL transmission with UL self-interference.

3. The apparatus of claim 1, wherein the indication of the maximum overlap between DL and UL resources for FD communication comprises an indication of a number of resources associated with the maximum overlap and an indication of a type of resource associated with the number of resources, the type of resource being one of a resource block group, a resource block, or a resource element.

4. The apparatus of claim 3, wherein the indication of the number of resources indicates a negative number of resources that indicates a magnitude of a guard band in sub-band (SB) FD (SBFD) communication.

5. The apparatus of claim 3, wherein the indication of the maximum overlap between DL and UL resources for FD communication is provided in an information element comprising an identification of the indicated number of resources and the indicated type of resource.

6. The apparatus of claim 1, wherein the at least one processor coupled to the memory is further configured to establish a radio resource control (RRC) reconfiguration procedure with the at least one base station, wherein the indication of the FD UE assistance information is transmitted based on the RRC reconfiguration procedure.

7. The apparatus of claim 1, wherein the at least one processor coupled to the memory is further configured to receive, from the at least one base station, a request for UE assistance information, wherein the indication of the FD UE assistance information is transmitted based on the request for UE assistance information.

8. The apparatus of claim 1, wherein the at least one processor coupled to the memory is further configured to determine whether an error rate of FD communication is greater than a threshold, wherein the indication of the FD UE assistance information is transmitted based on the determination that the error rate of the FD communication is greater than the threshold.

9. A method of wireless communication at a user equipment (UE), comprising:
communicating, in a full duplex (FD) mode, with at least one base station;
determining, when communicating with the at least one base station in FD mode, FD UE assistance information including a maximum overlap between downlink (DL) resources and uplink (UL) resources for FD communication; and
transmitting, to the at least one base station, an indication of the determined FD UE assistance information including an indication of the maximum overlap between the DL and UL resources for the FD communication.

10. The method of claim 9, wherein the FD UE assistance information further comprises an indication of at least one of (1) at least one favored self-interference cancellation technique supported by the UE, (2) the maximum overlap between the DL and UL resources for in-band (IB) FD (IBFD) communication, (3) a minimum gap between DL and UL resources for sub-band (SB) FD (SBFD) communication, (4) a recommendation for reducing a maximum UL transmit power, (5) a recommendation for adjusting a timing advance (TA) parameter, (6) DL power ramping steps for failed DL reception, (7) at least one favored beam, (8) a buffer status for an UL signal buffer and a number of UL configured grants for transmitting information in the UL signal buffer, (9) whether the UE has information to transmit in an UL configured grant, or (10) a recommendation about a DL transmission power to enable the UE to decode a DL transmission with UL self-interference.

11. The method of claim 9, wherein the indication of the maximum overlap between DL and UL resources for FD communication comprises an indication of a number of resources associated with the maximum overlap and an indication of a type of resource associated with the number of resources, the type of resource being one of a resource block group, a resource block, or a resource element.

12. The method of claim 11, wherein the indication of the maximum overlap between DL and UL resources for FD communication is provided in an information element comprising an identification of the indicated number of resources and the indicated type of resource.

13. The method of claim 9, further comprising establishing a radio resource control (RRC) reconfiguration procedure with the at least one base station, wherein the indication of the FD UE assistance information is transmitted based on the RRC reconfiguration procedure.

14. The method of claim 9, further comprising receiving, from the at least one base station, a request for UE assistance information, wherein the indication of the FD UE assistance information is transmitted based on the request for UE assistance information.

15. The method of claim 9, further comprising determining whether an error rate of FD communication is greater than a threshold, wherein the indication of the FD UE assistance information is transmitted based on the determination that the error rate of the FD communication is greater than the threshold.

16. An apparatus for wireless communication at a base station, comprising:
a memory; and
at least one processor coupled to the memory and configured to:
communicate with at least one user equipment (UE) operating in a full duplex (FD) mode; and
receive, from the at least one UE, an indication of FD UE assistance information including an indication of a determined maximum overlap between downlink (DL) and uplink (UL) resources for FD communication.

17. The apparatus of claim 16, wherein the FD UE assistance information further comprises an indication of at least one of (1) at least one favored self-interference cancellation technique supported by the UE, (2) the determined maximum overlap the DL and UL resources for in-band (IB) FD (IBFD) communication, (3) a minimum gap between DL and UL resources for sub-band (SB) FD (SBFD) communication, (4) a recommendation for reducing a maximum UL transmit power, (5) a recommendation for adjusting a timing advance (TA) parameter, (6) DL power ramping steps for failed DL reception, (7) at least one favored beam, (8) a buffer status for an UL signal buffer and a number of UL configured grants for transmitting information in the UL signal buffer, (9) whether the UE has information to transmit in an UL configured grant, or (10) a recommendation about a DL transmission power to enable the UE to decode a DL transmission with UL self-interference.

18. The apparatus of claim 16, wherein the indication of the determined maximum overlap between DL and UL resources for FD communication comprises an indication of a number of resources associated with the determined maximum overlap and an indication of a type of resource associated with the number of resources, the type of resource being one of a resource block group, a resource block, or a resource element.

19. The apparatus of claim 18, wherein the indication of the number of resources indicates a negative number of resources that indicates a magnitude of a guard band in sub-band (SB) FD (SBFD) communication.

20. The apparatus of claim 18, wherein the indication of the determined maximum overlap between DL and UL resources for FD communication is received in an information element comprising an identification of the indicated number of resources and the indicated type of resource.

21. The apparatus of claim 16, wherein the at least one processor coupled to the memory is further configured to establish a radio resource control (RRC) reconfiguration procedure with the at least one UE, wherein the indication of the FD UE assistance information is received based on the RRC reconfiguration procedure.

22. The apparatus of claim 16, wherein the at least one processor coupled to the memory is further configured to transmit, to the at least one UE, a request for UE assistance information, wherein the indication of the FD UE assistance information is received based on the request for UE assistance information.

23. The apparatus of claim 16, wherein the indication of the FD UE assistance information is received based on an error rate of the FD communication being greater than a threshold.

24. A method of wireless communication at a base station, comprising:
communicating with at least one user equipment (UE) operating in a full duplex (FD) mode; and
receiving, from the at least one UE, an indication of FD UE assistance information including an indication of a determined maximum overlap between downlink (DL) and uplink (UL) resources for the FD communication.

25. The method of claim 24, wherein the FD UE assistance information further comprises an indication of at least one of (1) at least one favored self-interference cancellation technique supported by the UE, (2) the determined maximum overlap between the DL and UL resources for in-band (IB) FD (IBFD) communication, (3) a minimum gap between DL and UL resources for sub-band (SB) FD (SBFD) communication, (4) a recommendation for reducing a maximum UL transmit power, (5) a recommendation for adjusting a timing advance (TA) parameter, (6) DL power ramping steps for failed DL reception, (7) at least one favored beam, (8) a buffer status for an UL signal buffer and a number of UL configured grants for transmitting information in the UL signal buffer, (9) whether the UE has information to transmit in an UL configured grant, or (10) a recommendation about a DL transmission power to enable the UE to decode a DL transmission with UL self-interference.

26. The method of claim 24, wherein the indication of the determined maximum overlap between DL and UL resources for FD communication comprises an indication of a number of resources associated with the determined maximum overlap and an indication of a type of resource associated with the number of resources, the type of resource being one of a resource block group, a resource block, or a resource element.

27. The method of claim 26, wherein the indication of the number of resources indicates a negative number of resources that indicates a magnitude of a guard band in sub-band (SB) FD (SBFD) communication.

28. The method of claim 26, wherein the indication of the determined maximum overlap between DL and UL resources for FD communication is received in an information element comprising an identification of the indicated number of resources and the indicated type of resource.

29. The method of claim 24, further comprising establishing a radio resource control (RRC) reconfiguration procedure with the at least one UE, wherein the indication of the FD UE assistance information is received based on the RRC reconfiguration procedure.

30. The method of claim 24, further comprising transmitting, to the at least one UE, a request for UE assistance information, wherein the indication of the FD UE assistance information is received based on the request for UE assistance information.

* * * * *